United States Patent [19]

Kam et al.

[11] Patent Number: 4,749,471
[45] Date of Patent: Jun. 7, 1988

[54] CLOSED FCC CYCLONE PROCESS

[75] Inventors: Anthony Y. Kam; Frederick J. Krambeck, both of Cherry Hill; Klaus W. Schatz, Skillman, all of N.J.

[73] Assignee: Mobil Oil Corporation, New York, N.Y.

[21] Appl. No.: 37,104

[22] Filed: Apr. 10, 1987

Related U.S. Application Data

[60] Continuation of Ser. No. 831,769, Feb. 21, 1986, abandoned, which is a division of Ser. No. 529,452, Sep. 6, 1983.

[51] Int. Cl.⁴ .................. C10G 47/30; C10G 35/14
[52] U.S. Cl. ..................... 208/113; 208/157; 422/147; 55/432
[58] Field of Search ............. 208/113, 101, 104, 153, 208/157; 422/112, 144, 145, 147; 55/432

[56] References Cited

U.S. PATENT DOCUMENTS

| | | | |
|---|---|---|---|
| 2,464,812 | 3/1949 | Johnson | 23/1 |
| 2,612,433 | 6/1958 | Nicolai et al. | 23/1 |
| 2,838,063 | 6/1958 | Weits et al. | 137/382 |
| 2,862,786 | 6/1955 | Trainer | 23/1 |
| 2,901,331 | 8/1959 | Held et al. | 422/145 |
| 3,007,778 | 11/1961 | Wood et al. | 422/145 |
| 3,053,753 | 9/1962 | Slyngstad et al. | 422/144 X |
| 3,355,380 | 11/1967 | Luckenbach | 208/153 |
| 3,661,799 | 5/1972 | Cartmell | 252/417 |
| 3,667,196 | 6/1972 | Koenecke | 55/312 |
| 3,826,738 | 7/1974 | Zenz | 208/153 |
| 4,043,899 | 8/1977 | Anderson et al. | 422/144 X |
| 4,070,159 | 1/1978 | Myers et al. | 422/147 |
| 4,219,407 | 8/1980 | Haddad et al. | 208/151 |
| 4,310,489 | 1/1982 | Fahrig et al. | 422/112 X |
| 4,351,275 | 9/1982 | Bhojwani et al. | 122/7 R |
| 4,356,151 | 10/1982 | Woebcke et al. | 422/145 |
| 4,364,905 | 12/1982 | Fahrig et al. | 422/147 X |
| 4,394,349 | 7/1983 | Cartmell | 422/144 X |
| 4,402,913 | 9/1983 | McKinney | 422/145 X |
| 4,404,095 | 9/1983 | Haddad et al. | 208/101 |
| 4,426,277 | 1/1984 | Metrailer | 208/127 |
| 4,579,716 | 4/1986 | Krambeck et al. | 208/101 X |

*Primary Examiner*—Helen M. S. Sneed
*Assistant Examiner*—Glenn Caldarola
*Attorney, Agent, or Firm*—Alexander J. McKillop; Michael G. Gilman; Dennis P. Santini

[57] ABSTRACT

There is disclosed a fluid catalytic cracking (FCC) apparatus and process comprising a reactor riser zone, primary and secondary cyclones, connected in series to the riser zone, and a stripping zone. The riser zone, the primary and the secondary cyclones, and the stripping zone, are placed within a single reactor vessel. The primary cyclone is connected to the reactor riser zone by an enclosed conduit which prevents random post-thermal cracking of the hydrocarbons after they exit the reactor riser zone. The secondary cyclone is also connected to the primary cyclone by an enclosed conduit. Any one or both of the enclosed conduits contain a trickle valve to accommodate sudden increased surges of pressure and of flow of the hydrocarbons and catalyst mixture. The reactor riser zone is equipped with an opening which allows stripping gases, from the stripping zone, to enter the riser. The gases are subsequently conducted through the primary and secondary cyclones to the downstream fractionation means.

27 Claims, 2 Drawing Sheets

CLOSED FCC CYCLONE PROCESS

CROSS REFERENCE TO RELATED APPLICATION

This is a continuation of application Ser. No. 831,769, filed on Feb. 21, 1986, now abandoned, which is a division of application Ser. No. 529,452, filed Sept. 6, 1983.

BACKGROUND OF THE INVENTION

1. Field of the Invention

This invention relates to the separation of the catalyst phase from the gasiform phase in a fluidized catalytic cracking unit (FCC) reactor. More particularly, it relates to improvements in separating the catalyst phase from the gasiform phase, as the suspension comprising both phases is discharged from a riser conversion zone outlet, to minimize or substantially eliminate post-riser conversion zone cracking.

2. Description of the Prior Art

The field of catalytic cracking, particulary fluid catalytic cracking, has undergone significant development improvements due primarily to advances in catalyst technology and product distribution obtained therefrom. With the advent of high activity catalysts and particularly crystalline zeolite cracking catalysts, new areas of operating technology have been encountered requiring even further refinements in processing techniques to take advantage of the high catalyst activity, selectivity and operating sensitivity.

Of particular concern in this field has been the development of methods and systems for separating gasiform products from fluidizable catalyst particles, particularly from a high activity crystalline zeolite cracking catalysts, under more efficient separating conditions so as to reduce the overcracking of conversion products and promote the recovery of desired products of a hydrocarbon conversion operation. However, prior art FCC reactor and cyclone designs often permitted an undesired extended residence time of the product vapor in the large disengaging space above the catalyst stripping zone, discussed below. This extended residence time, it is estimated, contributes to a loss of the desired product yield of up to about 4 percent due to non-selective thermal cracking. Recent developments in this art have been concerned with the rapid separation and recovery of entrained catalyst particles from gasiform products in a short contact time riser hydrocarbon conversion operation.

The hydrocarbon conversion catalyst usually employed in an FCC installation is preferably a high activity crystalline zeolite catalyst of a fluidizable particle size which is transferred in suspended or dispersed phase condition generally upwardly through one or more riser conversion zones providing a hydrocarbon residence time in each conversion zone in the range of 0.5 to about 10 seconds, and more usually less than about 8 seconds. High temperature riser hydrocarbon conversions of at least 1000° F. at 0.5 to 4 seconds hydrocarbon residence time in contact with the catalyst in the riser are desirable for some operations before initiating separation of vaporous hydrocarbon product materials from the catalyst. Rapid separation of catalyst from hydrocarbons discharged from a riser conversion zone is particularly desirable for restricting hydrocarbon conversion time. During the hydrocarbon conversion step, carbonaceous deposits accumulate on the catalyst particles and the particles entrain hydrocarbon vapors upon removal from the catalyst conversion step. The entrained hydrocarbons are subjected to further contact with the catalyst until they are removed from the catalyst by mechanical means, such as cyclones, and/or stripping gas in a separate catalyst stripping zone. The catalyst stripping zone is usually placed within the FCC reactor vessel beneath the cyclones. Hydrocarbon conversion products separated from the catalyst and stripped materials are combined and passed to a product fractionation step. Stripped catalyst containing deactivating amounts of carbonaceous material, hereinafter referred to as coke, is then passed to a catalyst regeneration operation.

Various processes and mechanical means have been employed heretofore to effect rapid separation of the catalyst phase from the hydrocarbon phase at the termination of the riser cracking zone, to minimize contact time of the catalyst with cracked hydrocarbons.

Cartmell, U.S. Pat. No. 3,661,799, discloses a process for catalytic conversion of petroleum feedstocks wherein the fluidized mixture of the cracking catalyst and cracked feedstock leaves a vertically-disposed reactor section and enters a cyclone separator, placed in a separate stripper vessel, through a conduit. The conduit contains an annulus which allows an inert stripping gas and associated stripped vapors to pass into the cyclone separator.

Anderson, et al., U.S. Pat. No. 4,043,899, disclose a method for rapid separation of a product suspension comprising fluidized catalyst particles and the vaporous hydrocarbon product phase by discharging the entire suspension directly from the riser conversion zone into a cyclonic separation zone which provides cyclonic stripping of the catalyst after it is separated from the hydrocarbon vapors. In the method of Anderson et al., the cyclone separator is modified to include an additional downwardly extending section comprising a lower cyclone stage. In this arrangement, catalyst separated from the gasiform material in the upper stage slides along a downwardly sloping baffle to the lower cyclone where stripping steam is introduced to further separate entrained hydrocarbon products from the catalyst recovered from the upper cyclone. The steam and the stripped hydrocarbons are passed from the lower cyclone through a concentric pipe where they are combined with the hydrocarbon vapors separated in the upper cyclone. The separated and stripped catalyst is collected and passes from the cyclone separator by conventional means through a dipleg. This process requires that the entire volume of catalyst, gasiform phase and stripping steam pass through the cyclone separator, which means that this equipment must be designed to efficiently handle not only a large vapor volume but also a large quantity of solid particles.

Myers et al., U.S. Pat. No. 4,070,159, provide a separation means wherebx the bulk of the solids is discharged directly into the settling chamber without passing through a cyclone separator. In this apparatus, the discharge end of the riser conversion zone is in open communication with the disengaging chamber such that the catalyst discharges from the riser in a vertical direction into the disengaging chamber which is otherwise essentially closed to the flow of gases. The cyclone separation system is in open communication with the riser conversion zone by means of a port located upstream from but near the discharge end of the riser conversion zone. A deflector cone mounted directy above the terminus of the riser causes the catalyst to be directed in a downward path so as to prevent the catalyst from abrading the upper end of the disengaging vessel. The cyclone separator is of the usual configuration employed in a catalytic cracking unit to separate entrained catalyst particles from the cracked hydrocarbon products so that the catalyst passes through the dipleg of the cyclone to the body of the catalyst in the lower section of the disengaging vessel and the vaporous phase is directed from this vessel to a conventional fractionation unit. There is essentially no net flow of gases within the disengaging vessel beyond that resulting from a moderate amount of steam introduced to strip the catalyst residing in the bottom of the disengaging vessel.

Haddad et al., U.S. Pat. No. 4,219,407, disclose the separation of the catalyst from the gasiform cracked products in a fashion which permits effective steam stripping of the catalyst. The suspension of catalyst and gasiform material is discharged from the riser conversion zone outwardly through radially extending passageways, or arms, which terminate in a downward direction. Catalyst stripping zones, or strippers, are located beneath the terminus of each of the radially extending passageways. Each stripper consists of a vertical chamber open at the top and the bottom with downwardly sloping baffles located within the chamber so as to cause the catalyst to flow in a discontinuous manner countercurrently to upwardly flowing stripping steam introduced at tne lower end of the stripping chamber. The radially extending arms are each provided with a curved inner surface and confining sidewalls to impart a cyclonic concentration of catalyst particles promoting a forced separation thereof from the hydrocarbon vapors. The separation of the catalyst from the vapors is basically achieved through rapid changes in the direction of flow of the catalyst and the vapors. Thus, the cyclonic collection and concentration of catalyst particles is used to reverse the flow of separated catalyst such that it is concentrated as a downwardly confined stream which discharges generally downwardly and into the open upper end of the catalyst stripping chamber. A vapor disengaging space is provided between the discharge end of the radially extending arms and the top of the catalyst strippers to promote the rapid removal of separated vapors from the catalyst. The separated vapors pass upwardly through the disengaging vessel to the open inlet of a cyclone separator which removes entrained catalyst from the gasiform material for return through a dipleg to the body of steam-stripped catalyst while the separated vaporous material passes to a fractionation unit. The hydrocarbon product, as it passes within the disengaging vessel from the discharge of the radially extending arms to the cyclone separator, travels in a random fashion and is exposed to catalytic reaction temperatures which may cause undesirable side reactions and thermal cracking before these vapors enter a quench zone in the main fractionator of the fluid cracking unit.

Haddad et al., allowed U.S. patent application Ser. No. 400,843, filed July 22, 1982, disclose an FCC reactor comprising a riser with radially extending sidearms as the first catalyst-hydrocarbon separation means. The sidearms force the suspension of the catalyst and the hydrocarbons to suddenly change the direction of flow from the vertical to the horizontal, thereby forcing preliminary separation of the gaseous hydrocarbons from the solid catalyst particles. The catalyst particles fall in a downward direction, to a stripping means, while the hydrocarbons, with some entrained catalyst particles, proceed to a secondary separation means, such as a cyclone. The sidearms and the secondary separation means are enclosed by a vertical conduit to prevent random uncontrolled thermal crackinq of the hydrocarbons. However, no means are provided in the apparatus and process of this Haddad et al. patent application for accommodating a sudden increase in pressure and the accompanying sudden increased rate of flow of the catalyst. Such unexpected increased pressure and the rate of flow of the cracking catalyst may be caused by FCC apparatus operating upsets, e.g., by the vaporized liquid water entering the bottom of the riser with the oil feed.

With the conventional prior art cyclone systems, such large unexpected surges of increased pressure and of catalyst flow were easily accommodated because the additional catalyst volume was discharged directly into the reactor vessel and the pressure surges were released in the same manner. However, with the closed cyclone system, such a surge would be carried directly to the downstream cyclones and could be carried over into tne downstream fractionator unit, resulting in an undesirable increase in fractionator bottoms fines content.

It is a primary object of this invention to provide an improved process and apparatus for rapidly separating cracking catalyst from gasiform material and to provide an effective means of improving the ability of the FCC system to tolerate sudden system pressure increases and the accompanying surges in the catalyst rate of flow.

It is another object of this invention to provide an improved means for separating cracking catalyst from a gasiform material in a fluid catalytic cracking (FCC) process.

It is a further object of this invention to provide a process and an apparatus for separating cracking catalyst from gasiform material whereby the length of time the gasiform material is subjected to high temperature after separation from the bulk of the catalyst is minimized so as to reduce non-selective thermal cracking of the vapor products.

SUMMARY OF THE INVENTION

An FCC process and apparatus comprising a closed cyclone system for separating the catalyst from cracked hydrocarbon feed after the mixture of catalyst and feed exits the FCC cracking zone, e.g., FCC riser, is equipped with a means for providing a surge capacity to accommodate a sudden increased rate of flow of the catalyst stream. The closed cyclone system of the present invention comprises a primary cyclone and a secondary cyclone means, or primary and secondary cyclones. The primary cyclone is connected to the FCC cracking zone by an enclosed conduit. The secondary cyclone is placed in-series with the primary cyclone, and the outlet of the primary cyclone is also connected by an enclosed conduit with the inlet of the secondary cyclone. The enclosed conduits limit the exposure of the cracked hydrocarbons to the high temperatures of the FCC reactor, thereby expediting the transfer of cracked hydrocarbons to the secondary cyclone and preventing undesirable post-riser thermal cracking of the hydrocarbons. The solid catalyst particles are separated as a catalyst stream from the hydrocarbon vapors in the two cyclone separation means. Most of the catalyst stream from the cyclones is then directed to a stripper zone, e.g., a steam stripper, placed below the cyclones, and the hydrocarbon product is directed to a downstream fractionation means. The surge capacity means is provided in the enclosed conduit connecting the FCC cracking zone with the primary cyclone, in the enclosed conduit connecting the primary with the secondary cyclone, or in both, the enclosed conduits connecting the riser with the primary cyclone and the primary with the secondary cyclones. The FCC cracking zone of this invention is provided with an opening, such as a concentric vent, surrounding the FCC riser, which receives the stripping gases from the stripper zone. The stripping gases are then conducted to the primary and secondary cyclones and subsequently exit the reactor vessel together with the cracked hydrocarbons.

DETAILED DESCRIPTION OF THE INVENTION

Figures 1, 2:
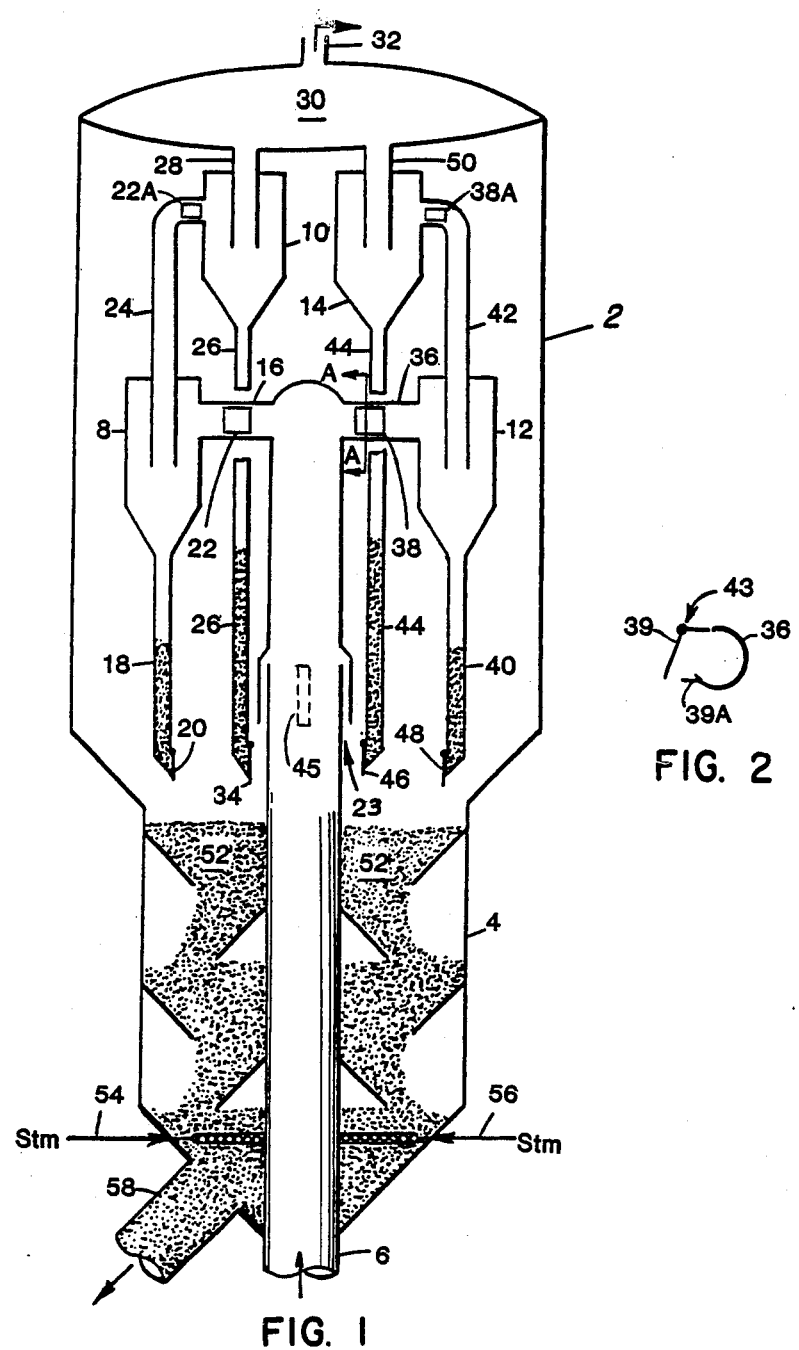
FIG. 1 is a schematic representation of a side view of one embodiment of a fluid catalytic cracking (FCC) reactor of the present invention.
FIG. 2 is the front view of the surge capacity means taken along the axis A—A of FIG. 1.

The means for providing surge capacity to accommodate the sudden increased pressure and the sudden increased rate of flow of the catalyst stream can be, for example, a trickle valve which is positioned in one or both of the aforementioned enclosed conduits (e.g., see FIG. 1). The trickle valve, or any other surge capacity means, is usually held closed by the higher pressure outside the enclosed conduit than inside thereof. However, during the upset or surge conditions, the pressure inside the conduit exceeds that on the outside thereof forcing the surge capacity means to open and vent the excess material into the large reactor vessel surrounding the cyclones and the enclosed conduit. Therefore, in the event of a sudden unexpected surge of increased pressure and of the increased catalyst volume flow, the surge capacity means allows excess catalyst and hydrocarbon gases to exit the conduit connecting the riser with the primary cyclone, and the excess catalyst is deposited in the bottom of the reactor vessel. The provision of the surge capacity means prevents the primary and secondary cyclone dipleg flooding and large catalyst carryover from the FCC reactor to the main fractionation column, both of which might occur without the surge capacity means, in the event of the surge conditions. In this connection, the term increased rate of catalyst flow, as used herein and in the appended claims, designates a short term 2 to 20-fold increase of flow of catalyst by volume per unit of time of the steady state rate of the catalyst stream flow. Similarly, the term sudden increase in pressure designates the pressure increase inside the enclosed conduit of 2-10 psi, as compared to the steady state operating conditions.

Figure 3:
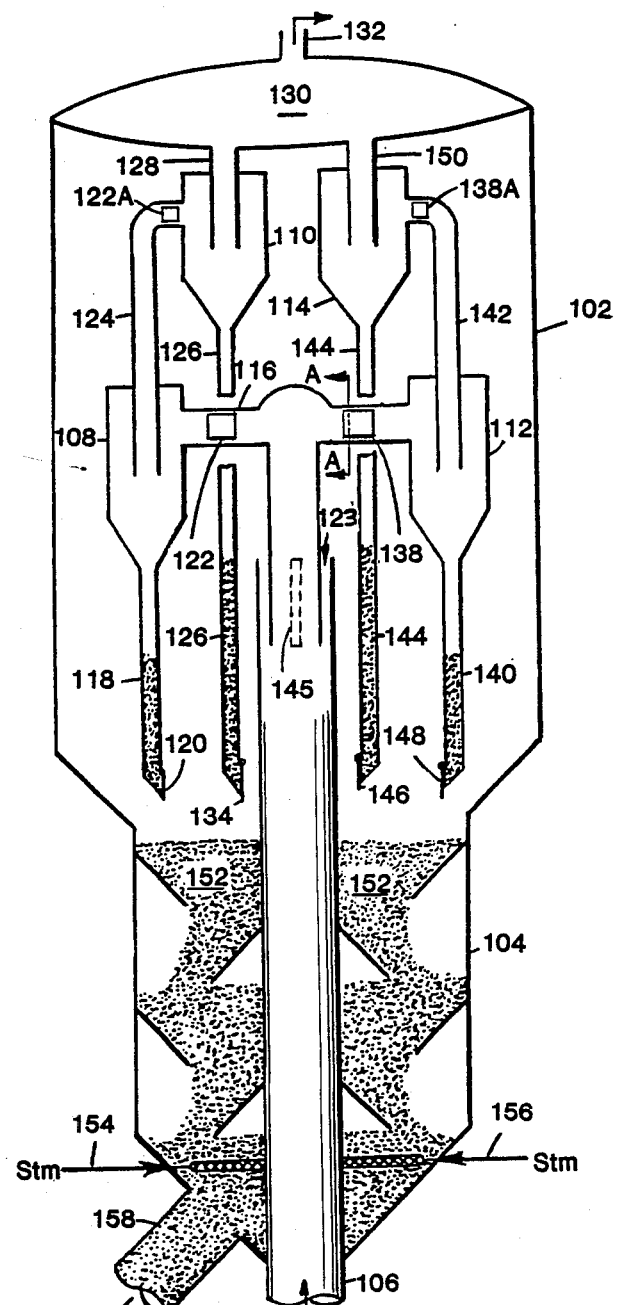
FIG. 3 is a schematic representation of a side view of an alternative embodiment of an FCC reactor of the present invention.

The FCC riser of this invention also contains an opening which allows the major portion of the stripping gases from the stripping zone, e.g., steam, and stripped hydrocarbons to enter the riser. The stripping gases are then conducted to the primary and secondary cyclones and, subsequently, along with the cracked hydrocarbons, to the downstream fractionation means. Two convenient manners of providing the opening are illustrated in FIGS. 1 and 3, wherein a concentric annular vent extending the entire circumference of the riser is provided either by the riser reactor having an upper portion of a larger diameter (FIG. 1) or of a smaller diameter (FIG. 3) than the remainder of the riser. In these embodiments, the upper portion of the riser is maintained in a substantially concentric relationship to the remainder of the riser by any conventional means, e.g., spacers, as shown in FIGS. 1 and 3. If the concentric port of FIGS. 1 or 3 is provided for the entrance of stripping gases, it is important to maintain the two portions of the riser in a substantially concentric relationship to each other, since the missalignment of the two portions of the riser increases the amount of backmixing of the catalyst and hydrocarbons suspension in the riser. The two portions of the riser must be aligned so that the maximum eccentricity is 10% and the minimum gas velocity through the port is about 2 feet/second (ft/sec). The term eccentricity is defined herein as $E = S/S_o - 1$ where S is the actual port width and $S_o$ is the port width for concentric alignment. The opening provided by the concentric port is sized so that the gases entering the riser have the linear velocity of about 2 to about 100 feet/second (ft/sec.), preferably about 10 to about 50 ft/sec. It will be obvious to those skilled in the art that any length of the upper portion of the riser may be used to provide the concentric opening as long as the partitioning of the riser into two portions of uneven diameter does not interfere with the operation of the riser reactor. Thus, for example, the inlet of the opening provided by the two uneven portions of the riser must be spaced a suitable distance from the top of the stripper, e.g., at least two to five feet above the upper level of the stripper bed, and it must be placed at a suitable distance from the point wherein the suspension of catalyst and cracked hydrocarbons exits the riser reactor, e.g., at least two to three riser diameters.

A portion of the remaining stripping gas and stripped hydrocarbons leaves the stripper through a conduit carrying spent catalyst to the regenerator. The bottom of the surge capacity means may be elevated, for example, by providing a serrated edge spacer in the wall of the conduit which supports the bottom of the surge capacity means in a spaced relationship with respect to the conduit and allows for the remaining portion of the stripping gases and stripped hydrocarbons from the stripper to enter the conduit.

The advantages of the closed cyclone system of the present invention reside in changing the pressure relationship and in decreasing the amount of uncontrolled post-riser cracking within the reactor vessel, as compared to the prior art FCC reactor vessel designs. With the closed cyclone system, the pressure in the reactor vessel is higher than inside the primary cyclone. Accordingly, substantially no hydrocarbons flow down the dipleg or from the surge capacity means into the reactor vessel. This pressure relationship induces the buildup of a positive seal of catalyst in the primary cyclone dipleg.

In contrast, in prior art designs using open cyclone arrangements (e.g., as disclosed by Gross et al in U.S. Pat. No. 4,118,338) the pressure inside the primary cyclone was higher than in the surrounding reactor vessel. Accordingly, catalyst seal did not build up in tne cyclone dipleg and hydrocarbons could readily escape into the reactor vessel through the dipleg, where additional backmixing and post-riser cracking took place.

The closed cyclone arrangement of the present invention substantially reduces the concentration of hydrocarbons in the reactor vessel, thereby virtually eliminating undesirable post-riser thermal and catalytic cracking present in the prior art designs. Gas tracer experiments were carried out in a commercial FCC unit having a prior art design, similar to that disclosed, for example in U.S. Pat. No. 4,118,338, to determine the extent of backmixing and the residence time of product hydrocarbons in the reactor vessel. The results indicate 40-50% by weight (wt %) backmixing. It is estimated that the installation of a closed cyclone system of this invention would reduce the amount of backmixing to less than 6% by weight. Estimated potential benefits of the closed cyclone system based on the above assumption (i.e., 6 wt % backmixing) at the constant coke make and riser top temperature are summarized below in Table I.

TABLE I

Closed Cyclone Benefits
Constant Coke at 980° F. Riser Top Temperature

| | Base Yields | Yield Changes |
|---|---|---|
| Riser Top Temperature., °F. | 980 | 980 |
| Conversion, vol. % | 70.0 | −0.2 |
| C$_5$+ Gasoline, vol. % | 50.8 | +1.0 |
| Light Fuel Oil (LFO), vol. % | 23.0 | +0.7 |
| Heavy Fuel Oil (HFO), vol. % | 7.0 | −0.5 |
| C$_4$ Hydrocarbons, wt % | 13.7 | −0.4 |
| Butylenes | 7.7 | −0.2 |
| Iso-butane | 4.6 | −0.1 |
| Normal Butane | 1.4 | −0.1 |
| C$_3$ Hydrocarbons, wt % | 9.8 | −0.3 |
| Pentenes | 7.4 | −0.1 |
| Pentane | 2.4 | −0.2 |
| C$_2$ and lower hydrocarbons, wt % | 3.7 | −0.7 |
| Coke, wt % | 5.5 | 0 |
| R + O Octane | 90 | −0.76 |
| Coke/Oxygen (C/O) | 7.6 | +0.14 |
| LFO Cetane Index | 17.1 | +0.7 |

The data of Table I indicates that the closed cyclone system would increase total gasoline plus distillate yield by about 1.7 volume % at the expense of light gas and heavy fuel oil. Gasoline octane would decrease by about 0.8 numbers due to the reduction of thermal cracking.

If the refinery were able to take advantage of the significant reduction in FCC gas make by increasing FCC operating severity (i.e., increasing riser top temperature) to maintain the same gas make, it is estimated that the gasoline plus distillate yield would be increased by about 1.2 volume % at the expense of heavy fuel oil production with about 0.2 numbers increase in gasoline octane number. This estimate is summarized below in Table II:

TABLE II

Closed Cyclone Benefits - Constant Wet Gas Make

| | Base Yields | Yield Changes |
|---|---|---|
| Riser Top Temp., °F. | 980 | 989 |
| Preheat, °F. | 355 | 355 |
| Conversion, vol. % | 70.0 | +0.8 |
| C$_5$+ Gasoline, vol. % | 50.8 | +1.2 |
| Light Fuel Oil (LFO), vol. % | 23.0 | +0.0 |
| Heavy Fuel Oil (HFO), vol. % | 7.0 | −0.8 |
| C$_4$ Hydrocarbons, wt % | 13.7 | +0.4 |
| Butylenes | 7.7 | +0.2 |
| Iso-butane | 4.6 | +0.1 |
| Normal Butane | 1.4 | +0.1 |
| C$_3$ Hydrocarbons, wt % | 9.8 | −0.05 |
| Pentenes | 7.4 | −0.1 |
| Pentane | 2.4 | +0.05 |
| C$_2$ and lower hydrocarbons, wt % | 3.7 | −0.2 |

TABLE II-continued

Closed Cyclone Benefits - Constant Wet Gas Make

| | Base Yields | Yield Changes |
|---|---|---|
| Coke, wt % | 5.5 | 0 |
| R + O Octane | 90 | +0.2 |

The invention will now be described in connection with two specific embodiments thereof illustrated in FIGS. 1, 2 and 3. These embodiments, however, are not to be construed as a limitation on the scope of the invention.

Referring to FIG. 1, a reactor vessel 2 is provided with a catalyst stripping section 4 in a lower bottom portion of the vessel. The vessel 2 surrounds the terminal end of a riser conversion zone 6, to which are attached primary cyclone separating means 8 and 12, and secondary cyclone separating means 10 and 14, respectively. The primary cyclone separating means, or cyclones, 8 and 12 are attached by conduits 16 and 36, respectively, to the outlet of the riser conversion zone, or riser, 6. The outlet of the primary cyclones 8 and 12, is, in turn, attached to the secondary cyclones 10 and 14 by conduits 24 and 42, respectively. It will be apparent to those skilled in the art that although only two pairs of the primary and secondary cyclones are shown in the embodiment of FIG. 1, more than two pairs of the primary and secondary cyclones can be used in a commercial installation without impairing the operation of the apparatus and the process of the present invention. It will also be apparent to those skilled in the art that although the operation of only one pair of the cyclones 8 and 10 is described below, additional cyclones are operated in the manner identical to that of cyclones 8 and 10.

Cyclone separator 8, attached to the discharge end of riser 6 by the conduit means 16 is provided with a catalyst dipleg 18, provided with a trickle valve 20 on the bottom discharge end thereof. An annular opening 23 is provided in the riser 6 to allow steam from the stripper 4 to enter the riser 6. Gasiform material separated in cyclone 8 passes through a conduit 24 to the secondary cyclone 10, wherein a further separation of catalyst fines from gaseous material is made. Separated catalyst is withdrawn by dipleg 26 from the secondary cyclone, and a gasiform material is passed from the cyclone 10 by conduit 28 to plenum chamber 30 for removal by a conduit 32 and passage to a downstream fractionation equipment, not shown for clarity. The secondary cyclone 10 is provided with a dipleg 26, which is provided with a trickle valve 34 at the bottom end thereof.

The conduits 16 and 36 are provided with trickle valves 22 and 38, respectively, for accommodating sudden unexpected surges of increased pressure and of flow rate of the suspension comprised of fluidized catalyst particles and cracked hydrocarbons. The surge capacity means, in addition to the trickle valves 22 and 38, shown in FIG. 1 may also comprise, for example trickle valves on both sides of conduits 16 and 36, respectively. Alternatively, only conduits 24 and 42 may be provided with trickle valves 22A and 38A, respectively, to accommodate the increased pressure and catalyst flow rate surges. In yet another embodiment, all four conduits 16, 24, 36 and 42 are provided with trickle valves 22, 22A, 38 and 38A, respectively, as shown in FIG. 1, to accommodate the increased pressure and catalyst flow rate surges. FIG. 2 illustrates the detail of the valve 38, and it will be apparent to those skilled in the art that other trickle valves, e.g., valves 22, 22A and 38A are constructed and operated in the manner identical to that of the valve 38. Referring to FIG. 2, a plate 39 of the valve 38 is attached by a hinge 43 to the conduit 36, thereby allowing the valve 38 to open in response to an increased pressure within the conduit 36. To open the valve 38 the pressure within the conduit 36 must exceed the pressure within the vessel 2 surrounding the conduit 36. Under normal operating conditions, the pressure within the conduit 36 does not exceed the pressure within vessel 2, and therefore the valve 41 remains closed. However, during sudden unexpected surges of the catalyst and hydrocarbon suspension flow, or during unexpected pressure increases, as defined above, pressure within the conduit 36 exceeds that in vessel 2 and forces valve 38 to open, which allows the suddenly increased flow of the suspension to exit the conduit 36 through the opening and eliminate the excess material from the system. In the absence of the valve 38, the surge conditions may cause the entrainment of a large proportion of the catalyst within the cracked hydrocarbon stream, which, in turn, may cause excessive catalyst carryover to the FCC main fractionation column or damage to the internal apparatus of the fractionation column. The valves 38 and 22, or other surge capacity means, are sized to accommodate surges of up to 20 times the steady state rate of catalyst flow. The bottom portion of valve plate 39 leans against the serrated edge 39A of the horizontal plate protruding from the conduit 36. The serrated edge permits the stripping steam to enter conduit 36, thereby preventing coke build-up on the edge of plate 39A which could partially or totally seal the valve 39.

The catalyst separated in diplegs 18, 26, 40 and 44 is discharged from the diplegs after a suitable pressure is generated within the diplegs by the buildup of the catalyst, and it falls into a bed of catalyst 52 therebelow. The bed 52 is contacted with a stream of a stripping gas, such as steam, flowing countercurrently to the direction of flow of the catalyst. The gas is introduced into the lower bottom portion of the stripping section 4 by one or more conduits 54 and 56. After the stripping gas leaves the stripper section 4, a portion thereof is conducted into the riser 6 by the annular opening 23. The opening 22 is formed by providing an upper section of the riser of a larger diameter than the lower section thereof, as illustrated in FIG. 1. Three or more spacers 45 are provided between the two sections of the riser to maintain the two sections concentric and separated from each other by an equal distance. Stripped catalyst is removed by a conduit 58 for passage to catalyst regeneration zone or a second stage of hydrocarbon conversion zone, depending upon the activity and tne amount of carbonaceous materials, or coke, deposited on the catalyst particles.

The principal purpose of the enclosed conduits 16, 24, 36 and 42 is to provide a direct controlled passage of the cracked vapors from the riser reactor to the primary and then secondary cyclones, and therefore to limit the time the cracked vapors are exposed to elevated cracking temperatures. Otherwise, the cracked vapors would pass randomly and at lower velocity through the upper portion of vessel 4 to the cyclone separating means. This would provide additional opportunity for nonselective thermal cracking of the hydrocarbons, thereby lowering the product yield. By providing a direct enclosed path for the vapors to be transported out of the elevated temperature zone, there is provided an opportunity for the vapors to be quenched and fractionated in a controlled manner in the main fractionator of the processing unit, thereby limiting undesirable thermal overcracking. Thus, in accordance with the present invention, the separation of catalysts from hydrocarbonaceous materials is achieved efficiently, while, at the same time, the length of time that the gaseous materials are subjected to high cracking reaction temperatures after separation from the catalyst is minimized. The direct connection between the primary and secondary cyclones provided by the enclosed conduits 16, 24, 36 and 42 is principally responsible for the reduction in thermal post-riser cracking. It will be apparent to those skilled in the art, that more than one surge capacity means, such as trickle valves 22, 22A, 38 and 38A, may be provided in the enclosed conduits 16, 24, 36 and 42, respectively.

In the method and apparatus of the present invention, a higher pressure is maintained outside the primary cyclone than on the inside thereof. This causes a seal of catalyst to build up in the dipleg to a selected height depending on the pressure imposed on the system. The seal of catalyst in the dipleg substantially prevents the flow of gasiform material into the dipleg. In contrast, in conventional prior art designs, the pressure inside the primary cyclone was maintained higher than the pressure outside of the cyclone. As a result, the gasiform hydrocarbon product had an opportunity to remain in contact with the catalyst for a longer time by being drawn down into the cyclone dipleg. In the process and apparatus of the present invention, the hydrocarbons exiting the primary cyclone enter the secondary cyclone directly through the conduits 24 and 42, respectively, and in the presence of a reduced amount of catalyst. In addition, the stripping steam and stripped hydrocarbons are generally at a lower temperature than the suspension of catalyst and cracked hydrocarbons passed to the primary cyclone, and the admixture of this lower temperature stripping steam and hydrocarbons in the primary and/or secondary cyclones considerably reduces overcracking and improves the separation of hydrocarbon vapors from catalyst particles in the suspension entering the cyclone.

In another embodiment of the invention, one or more of the primary cyclones, such as 8 and 12 shown in FIG. 1, may be modified to incorporate the stripping arrangement of the stripper cyclone of U.S. Pat. No. 4,043,899, the entire contents of which are incorporated herein by reference. The employment of the stripper cyclone instead of the conventional primary cyclone shown in FIG. 1 renders the operation even more effective for accomplishing the results desired insofar as hydrocarbon vapors flowing downwardly in the diplegs of the stripper cyclone in the interstitial volume between the catalyst particles can be displaced by stripping steam supplied to the stripper cyclones.

In an alternative embodiment of the invention illustrated in FIG. 3, the concentric annular opening 123 is formed in the riser by providing the upper section of the riser of a smaller diameter than the lower section thereof. Aside from that change, the embodiment of FIG. 3 is operated in the manner identical to the embodiment of FIGS. 1 and 2. All of the component parts of the apparatus of FIG. 3 are numbered in a manner similar to that of FIG. 1 with a prefix 100, e.g., riser 6 of FIG. 1 corresponds to riser 106 of FIG. 3. It is believed that further operation of the embodiment of FIG. 3 will be apparent to those skilled in the art from the detailed description of the operation of FIGS. 1 and 2 above.

In one specific embodiment of the present invention, the process is conducted in such a manner that the pressure at the top of the riser reactor conduit is about 31.4 pounds per square inch gauge (psig); the pressure within the reactor vessel and outside of the riser is about 31.4 psig; the pressure within the first stage cyclone is about 30.5 psig; the pressure within the second stage cyclone is about 29.3 psig; and the pressure in the plenum chamber 30 is about 28.8 psig. Under these pressure operating conditions, it is estimated that the second stage cyclone dipleg will develop a catalyst seal in the dipleg of approximately 10 feet and a catalyst seal in the primary cyclone will be about 4.3 feet.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A process for the fluid catalytic cracking of a hydrocarbon feed in a closed cyclone system comprising the steps of:

passing a mixture, as a suspension of the hydrocarbon feed and a catalyst through a riser conversion zone defined by a vertically-disposed elongated tubular conduit having an upstream end and a downstream end, said downstream end being contained within a reactor vessel and cracking said hydrocarbon feed in said riser conversion zone;

passing an entire amount of said mixture from said riser conversion zone through a first enclosed conduit to a primary cyclone positioned within said reactor vessel, said entire mixture passing through said riser conversion zone, said first enclosed conduit and into said primary cyclone without passing into an atmosphere of said reactor vessel when said mixture flows at a steady state rate of flow;

separating a first portion of said catalyst from said mixture in said primary cyclone;

passing a first gaseous effluent from said primary cyclone through a second enclosed conduit and discharging the entire amount of said gaseous effluent from said reactor vessel without passing said gaseous effluent into said reactor vessel atmosphere when said gaseous effluent flows at a steady state rate of flow;

contacting said separated catalyst with stripping gas in a stripping zone, located within said reactor vessel, to remove hydrocarbons from said separated catalyst;

passing at least a portion of said stripping gas from said stripping zone into said riser conversion zone, said elongated conduit defining said riser conversion zone comprising two serially overlapped vertically extending sections, and said stripping gas portion passing into said riser conversion zone through an annular port defined within said reactor vessel between said two sections, said annular port being defined by sizing the top of the lower section of said riser conversion zone of a relatively smaller diameter than the bottom of the upper section of said riser conversion zone;

and discharging a portion of said mixture from said first enclosed conduit through a first surge capacity means during a sudden increased mixture flow rate, wherein said first surge capacity means is substantially closed during said steady state rate of flow of said mixture within said first enclosed conduit, wherein said first surge capacity means prevents catalyst flow therethrough when said first surge capacity means is substantially closed and allows stripping gas flow therethrough when said first surge capacity means is substantially closed.

2. The process of claim 1, wherein said first surge capacity means comprises a first opening in said first enclosed conduit and a first trickle valve covers said opening to prevent catalyst flow therethrough, and a top portion of said trickle valve pivots about a first trickle valve axis which is substantially perpendicular to the axis of said riser conversion zone.

3. The process of claim 2, wherein a bottom portion of said trickle valve is horizontally elevated with respect to said first enclosed conduit to form a passageway for passing said stripping gas from the atmosphere of said reactor vessel into said frist enclosed conduit when said trickle valve is substantially closed.

4. The process of claim 3, wherein a first serrated edge, attached to said first enclosed conduit, contacts and elevates said bottom portion of said trickle valve when said trickle valve is substantially closed.

5. The process of claim 4, wherein a two- to twentyfold sudden increase of said steady state rate of flow of said mixture opens said trickle valve to discharge a portion of said mixture into said reactor vessel atmosphere.

6. The process of claim 5, wherein the pressure in the reactor vessel is higher than in the primary cyclone.

7. The process of claim 6, wherein post-riser cracking in the reactor vessel is substantially eliminated.

8. The process of claim 6, further comprising the steps of removing a second portion of catalyst from said first gaseous effluent in a secondary cyclone in open communication with said second enclosed conduit prior to discharging a gaseous remainder of said first gaseous effluent from said reactor vessel without passing said gaseous remainder into said reactor vessel atmosphere; and discharging a portion of said first gaseous effluent from a portion of said second enclosed conduit, upstream of said secondary cyclone, through a second surge capacity means during a sudden increased rate of flow of said first gaseous effluent.

9. The process of claim 8, wherein said second surge capacity means is substantially closed during a normal rate of flow of said gaseous effluent within said second enclosed conduit, wherein said second surge capacity means prevents catalyst flow therethrough when said second surge capacity means is substantially closed and allows stripping gas flow therethrough when said second surge capacity means is substantially closed.

10. The process of claim 9, wherein said second surge capacity means comprises a second opening in said second enclosed conduit and a second trickle valve covers said second opening to prevent catalyst flow therethrough, and a top portion of said second trickle valve pivots about a second trickle valve axis which is substantially perpendicular to the axis of said riser conversion zone.

11. The process of claim 10, wherein a bottom portion of said second trickle valve is horizontally elevated with respect to said second enclosed conduit to form a passageway for passing said stripping gas from the atmosphere of said reactor vessel, into said second enclosed conduit when said second trickle valve is substantially closed.

12. The process of claim 11, wherein a second serrated edge, attached to said second enclosed conduit, contacts and elevates said bottom portion of said trickle valve when said second trickle valve is substantially closed.

13. The process of claim 12, wherein a two- to twenty-fold sudden increase of said steady state rate of flow of said first gaseous effluent opens said second trickle valve to discharge a portion of said first gaseous effluent into said reactor vessel atmosphere.

14. A process for the fluid catalytic cracking of a hydrocarbon feed in a closed cyclone system, comprising the steps of:
passing a mixture as a suspension of the hydrocarbon feed and a catalyst through a riser conversion zone defined by a vertically-disposed elongated tubular conduit comprising two serially-overlapped vertical sections and having an upstream end and downstream end, said downstream end being contained within a reactor vessel, and cracking said hydrocarbon feed in said riser conversion zone;
passing at least a portion of stripping gas from the atmosphere of said ractor vessel into said riser conversion zone through an annular port at a velocity of about 10 to about 50 feet per second, said annular port is defined within said reactor vessel between said two riser sections by sizing the top of the lower section of said riser of a relatively smaller diameter than the bottom of the upper section of said riser;
passing an entire amount of said mixture from said riser conversion zone through a first enclosed conduit to a primary cyclone positioned within said reactor vessel, said entire mixture passing through said riser conversion zone, said first enclosed conduit and said primary cyclone without passing into an atmosphere of said reactor vessel during a steady state rate of flow of said mixture, wherein the pressure in said reactor vessel is greater than that in said primary cyclone;
discharging a portion of said mixture from said first enclosed conduit through a first surge capacity means during a two- to twenty-fold sudden increase in said steady state rate of mixture flow, said first surge capacity means is substantially closed during said steady state rate of mixture flow, said first surge capacity means comprising a first opening in said first enclosed conduit, a first trickle valve which covers said first opening to prevent catalyst flow therethrough during said steady state mixture flow rate, wherein a top portion of said first trickle valve pivots about a first trickle valve axis which is substantially perpendicular to the axis of said riser conversion zone, and a bottom portion of said first trickle valve is horizontally elevated with respect to said first enclosed conduit to form a passageway for passing stripping gas from the atmosphere of said reactor vessel into said first enclosed conduit during said steady state mixture flow rate;
separating a first portion of said catalyst from said mixture in said primary cyclone;
passing the entire amount of a first gaseous effluent from said primary cyclone through a second enclosed conduit, separating a second portion of catalyst from said first gaseous effluent in a secondary cyclone in open communication with said second enclosed conduit, and discharging the entire amount of a gaseous remainder of said first gaseous effluent from said reactor vessel without passing said gaseous effluent and said gaseous remainder into said reactor vessel atmosphere when said first gaseous effluent flows at a steady state rate of flow;
discharging a portion of said first gaseous effluent from a portion of said second enclosed conduit, upstream of said secondary cyclone, through a second surge capacity means during a two- to twenty-fold sudden increase rate of flow of said first gaseous effluent, said second surge capacity means is substantially closed during said steady state flow rate of said first gaseous effluent, said second surge capacity means comprises a second opening in said second enclosed conduit, a second trickle valve which covers said second opening to prevent catalyst flow therethrough during said steady state gaseous effluent flow, wherein a top portion of said second trickle valve pivots about a second trickle valve axis which is substantially perpendicular to the axis of said riser conversion zone, and a bottom portion of said second trickle vavle is horizontally elevated with respect to said second enclosed conduit to form a second passageway for passing stripping gas from the atmosphere of said reactor vessel into said second enclosed conduit during said steady state gaseous effluent flow rate;
passing said first and second portions of separated catalyst to a catalyst stripping zone located in a portion of said reactor vessel below said cyclones; and
contacting said separated catalyst with a stripping gas in said stripping zone to remove hydrocarbons from said separated catalyst and then passing said stripping gas into the atmosphere of said reactor vessel.

15. A process for the fluid catalytic cracking of a hydrocarbon feed in a closed cyclone system, comprising the steps of:
passing a mixture, as a suspension, of the hydrocarbon feed and a catalyst through a riser conversion zone defined by a vertically disposed elongated tubular conduit having an upstream end and a downstream end, said downstream end being contained within a reactor vessel, and cracking said hydrocarbon feed in said riser conversion zone;
passing said mixture from said riser conversion zone through a first enclosed conduit to a primary cyclone positioned within said reactor vessel, said mixture passing through said riser conversion zone, first enclosed conduit and into said primary cyclone without passing into an atmosphere of said reactor vessel during a steady state rate of flow of said mixture;
discharging a portion of said mixture from said first enclosed conduit through a first surge capacity means during a sudden increased rate of flow of said mixture from said riser conversion zone, wherein said first surge capacity means is substantially closed during said steady state mixture flow rate within said first enclosed conduit, wherein said first surge capacity means prevents catalyst flow therethrough when said first surge capacity means is substantially closed and allows stripping gas flow therethrough when said first surge capacity means is substantially closed;

separting a first portion of said catalyst from said mixture in said primary cyclone;

passing a first gaseous effluent from said primary cyclone through a second enclosed conduit and discharging said gaseous effluent from said reactor vessel without passing said gaseous effluent into said reactor vessel atmosphere during a steady state rate of flow of said first gaseous effluent; and contacting said separated catalyst with stripping gas in a stripping zone, located within said reactor vessel, to remove hydrocarbons from said separated catalyst.

16. The process of claim 15, wherein said first surge capacity means comprises a first opening in said first enclosed conduit and a first trickle valve covers said opening to prevent catalyst flow therethrough, and a top portion of said trickle valve pivots about a first trickle valve axis which is substantially perpendicular to the axis of said riser conversion zone.

17. The process of claim 16, wherein a bottom portion of said trickle valve is horizontally elevated with respect to said first enclosed conduit to form a passageway for passing said stripping gas from the atmosphere of said reactor vessel into said first enclosed conduit when said trickle valve is substantially closed.

18. The process of claim 17, wherein a serrated edge, attached to said first enclosed conduit, contacts and elevates said bottom portion of said trickle valve when said trickle valve is substantially closed.

19. The process of claim 18, wherein a two- to twenty-fold sudden increase of the steady state mixture flow rate opens said trickle valve to discharge said portion of said mixture from said first enclosed conduit into said reactor vessel atmosphere.

20. The process of claim 19, wherein the pressure in the reactor vessel is higher than in the primary cyclone.

21. The process of claim 20, wherein post-riser cracking in the reactor vessel is substantially eliminated.

22. The process of claim 21, further comprising the step of removing a second portion of catalyst from said first gaseous effluent in a secondary cyclone in open communication with said second enclosed conduit prior to discharging a gaseous remainder of said first gaseous effluent from said reactor vessel without passing said gaseous remainder into said reactor vessel atmosphere;

discharging a portion of said first gaseous effluent from a portion of said second enclosed conduit, upstream of said secondary cyclone, through a second surge capacity means during a sudden increased rate of flow of said first gaseous effluent.

23. The process of claim 22, wherein said second surge capacity means is substantially closed during a steady state rate of flow of said gaseous effluent within said second enclosed conduit, wherein said second surge capacity means prevents catalyst flow therethrough when said second surge capacity means is substantially closed and allows stripping gas flow therethrough when said second surge capacity means is substantially closed.

24. The process of claim 23, wherein said second surge capacity means comprises a second opening in said second enclosed conduit and a second trickle valve covers said second opening to prevent catalyst flow therethrough, and a top portion of said second trickle valve pivots about a second trickle valve axis which is substantially perpendicular to the axis of said riser conversion zone.

25. The process of claim 24, wherein a bottom portion of said second trickle valve is horizontally elevated with respect to said second enclosed conduit to form a passageway for passing said stripping gas from the atmosphere of said reactor vessel into said second enclosed conduit when said second trickle valve is substantially closed.

26. The process of claim 25, wherein a second serrated edge, attached to said second enclosed conduit, contacts and elevates said bottom portion of said second trickle valve when said second trickle valve is substantially closed.

27. The process of claim 26, wherein a two- to twenty-fold sudden increase of the steady state rate of flow of said first gaseous effluent opens said second trickle valve to discharge said portion of said first gaseous effluent into said reactor vessel atmosphere.

* * * * *